United States Patent
Keskitalo et al.

(10) Patent No.: US 12,543,060 B2
(45) Date of Patent: Feb. 3, 2026

(54) LOGGING MULTICAST-BROADCAST SINGLE-FREQUENCY NETWORK MEASUREMENTS

(71) Applicant: Nokia Technologies Oy, Espoo (FI)

(72) Inventors: Ilkka Antero Keskitalo, Oulu (FI); Jorma Johannes Kaikkonen, Oulu (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 52 days.

(21) Appl. No.: 14/851,092

(22) Filed: Sep. 11, 2015

(65) Prior Publication Data

US 2016/0095011 A1    Mar. 31, 2016

Related U.S. Application Data

(60) Provisional application No. 62/056,219, filed on Sep. 26, 2014.

(51) Int. Cl.
*H04W 24/10* (2009.01)
*H04B 17/309* (2015.01)
(Continued)

(52) U.S. Cl.
CPC .......... *H04W 24/10* (2013.01); *H04B 17/309* (2015.01); *H04W 64/00* (2013.01);
(Continued)

(58) Field of Classification Search
None
See application file for complete search history.

(56) References Cited

U.S. PATENT DOCUMENTS

| 2011/0001373 A1 | 1/2011 | Mori et al. |
| 2011/0013730 A1* | 1/2011 | Mansson ............ H04B 7/0689 |
| | | 375/340 |

(Continued)

FOREIGN PATENT DOCUMENTS

| CN | 1921678 A | 2/2007 |
| CN | 101227635 A | 7/2008 |

(Continued)

OTHER PUBLICATIONS

Extended European Search Report received for corresponding European Patent Application No. 15183414.0, dated Apr. 11, 2016, 12 pages.

(Continued)

*Primary Examiner* — Anh Vu H Ly
(74) *Attorney, Agent, or Firm* — SQUIRE PATTON BOGGS (US) LLP

(57) ABSTRACT

Various communication systems may benefit from the appropriate logging of measurements. For example, communication systems employing multimedia broadcast multicast service may benefit from logging multicast-broadcast single-frequency network measurements. A method can include logging, by a user equipment, a multicast-broadcast single-frequency network measurement corresponding to a logging period. The method can also include storing, at the time the multicast-broadcast single-frequency network measurement is made, cell measurement results.

7 Claims, 6 Drawing Sheets

(51) Int. Cl.
  *H04W 64/00* (2009.01)
  *H04W 4/06* (2009.01)
  *H04W 76/40* (2018.01)
(52) U.S. Cl.
  CPC ............ *H04W 64/006* (2013.01); *H04W 4/06* (2013.01); *H04W 76/40* (2018.02)

(56) References Cited

U.S. PATENT DOCUMENTS

| | | | |
|---|---|---|---|
| 2011/0256833 A1* | 10/2011 | Racz | H04L 1/24 455/63.1 |
| 2013/0010624 A1 | 1/2013 | He et al. | |
| 2013/0121204 A1* | 5/2013 | Lee | H04W 24/10 370/252 |
| 2013/0128756 A1* | 5/2013 | Zhang | H04W 4/06 370/252 |
| 2014/0301210 A1* | 10/2014 | Kim | H04W 24/10 370/241 |
| 2015/0201344 A1* | 7/2015 | Wu | H04W 4/06 370/252 |
| 2015/0373506 A1* | 12/2015 | Jung | H04L 12/189 370/312 |
| 2016/0037368 A1* | 2/2016 | Wu | H04L 12/189 370/252 |
| 2016/0212595 A1* | 7/2016 | Fukuta | H04W 76/002 370/328 |
| 2016/0373953 A1* | 12/2016 | Fukuta | H04W 24/10 370/328 |
| 2017/0019772 A1* | 1/2017 | Kim | H04W 4/06 370/328 |
| 2017/0055171 A1* | 2/2017 | Keskitalo | H04W 24/10 370/328 |
| 2017/0055202 A1* | 2/2017 | Uchiyama | H04W 24/10 |
| 2017/0064518 A1* | 3/2017 | Kim | H04W 24/10 370/328 |
| 2017/0295054 A1* | 10/2017 | Lee | H04L 41/06 370/328 |

FOREIGN PATENT DOCUMENTS

| | | | |
|---|---|---|---|
| EP | 2360960 A2 | 8/2011 | |
| EP | 2528270 A1 | 11/2012 | |
| WO | WO-2006015427 A1 * | 2/2006 | ............ H04W 16/18 |
| WO | WO-2012/060765 A1 * | 5/2012 | |
| WO | 2014/126424 A1 | 8/2014 | |

OTHER PUBLICATIONS

"Introducing eMBMS Measurement", 3GPP TSG-RAN2#85 bis meeting, R2-141535, Agenda Item: 7.3.2, Samsung, Mar. 31-Apr. 4, 2014, 4 pages.
"Using Traditional PM for Providing Min UE Notification", 3GPP TSG SA WG5 (Telecom Management) Meeting #82, S5-120632, Agenda Item: 6.5.1, Nokia Siemens Networks, Mar. 26-30, 2012, 2 pages.
"Details of MBMS Measurements", 3GPP TSG-RAN WG1 #75, R1-135273, Agenda item: 6.2.5, NEC, Nov. 11-15, 2013, 4 pages.
"3rd Generation Partnership Project; Technical Specification Group Radio Access Network; Radio Resource Control (RRC); Protocol specification (Release 12)", 3GPP TS 25.331, V12.2.0, Jun. 2014, pp. 1-2140.
"3rd Generation Partnership Project; Technical Specification Group Radio Access Network; User Equipment (UE) procedures in idle mode and procedures for cell reselection in connected mode (Release 12)", 3GPP TS 25.304, V12.2.0, Jun. 2014, pp. 1-56.
"3rd Generation Partnership Project, Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)", 3GPP TS 37.320, V12.2.0, Sep. 2014, pp. 1-25.
"3rd Generation Partnership Project; Technical Specification Group Radio Access Network; Evolved Universal Terrestrial Radio Access (E-UTRA); Radio Resource Control (RRC);Protocol specification (Release 12)", 3GPP TS 36.331, V12.3.0, Sep. 2014, pp. 1-378.
"3rd Generation Partnership Project; Technical Specification Group Services and System Aspects; Telecommunication management; File Transfer (FT) Integration Reference Point (IRP): Common Management Information Protocol (CMIP) Solution Set (SS) (Release 6)", 3GPP TS 32.344, V6.0.0, Dec. 2014, pp. 1-15.
"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304, V12.2.0, Sep. 2014, pp. 1-37.
"MBSFN RSRP and RSRQ Measurement Reporting Requirements", 3GPP TSG-RAN WG4 Meeting #71, R4-142789, Agenda Item: 7.10.2, Alcatel-Lucent, May 19-23, 2014, 3 pages.
"MBSFN RS Based RSRP/RSRQ Requirements", 3GPP TSG-RAN WG4 Meeting #71, R4-143620, Agenda item: 7.10.2, Qualcomm Incorporated, May 19-23, 2014, pp. 1-3.
"MBSFN RSRP and RSRQ Measurement Requirements", 3GPP TSG-RAN WG4 Meeting #71, R4-143533, Agenda tem: 7.10.2, Nokia Corporation, May 19-23, 2014, 4 pages.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.5.0, Mar. 2015, pp. 1-445.
"3rd Generation Partnership Project; Technical Specification Group Radio Access Network; Evolved Universal Terrestrial Radio Access (E-UTRA); Requirements for support of radio resource management (Release 12)", 3GPP TS 36.133, V12.7.0, Mar. 2015, pp. 1-1014.
Office action received for corresponding Vietnam Patent Application No. 1-2015-03384, dated Oct. 19, 2015, 2 pages of office action and 1 pages of office action translation available.
Partial European Search Report received for corresponding European Patent Application No. 15183414.0, dated Jan. 27, 2016, 6 pages.
European Office Action issued in corresponding European Patent Application No. 15 183 414.0 on Oct. 16, 2017.
Chinese Office Action corresponding to Application No. 201510542112.4, dated Apr. 10, 2018.
U.S. Office Action issued in corresponding U.S. Appl. No. 15/601,585, filed Mar. 28, 2018.
Substantive Examination Report Stage I dated Jan. 30, 2020 corresponding to Indonesian Patent Application No. P00201505230, and Enligh translation thereof.
Vietnamese Office Action corresponding to VN Appln. No. 1-2015-03384, dated Mar. 9, 2020.
Chinese Office Action corresponding to Appln. No. 201510542112.4, dated Mar. 11, 2019.
Indian Office Action corresponding to Indian Appln. No. 5009/CHE/2015, dated Jun. 27, 2019.
Preliminary Office Action dated Jul. 18, 2020 corresponding to Brazilian Patent Application No. BR 10 2015 024575 0.
Office Action dated Jul. 28, 2020 corresponding to Vietnamese Patent Application No. 1-2015-03384, and English translation thereof.

\* cited by examiner

LOGGING MULTICAST-BROADCAST SINGLE-FREQUENCY NETWORK MEASUREMENTS

This application is related to and claims the benefit and priority of U.S. Provisional Patent Application No. 62/056,219, filed Sep. 26, 2014, which is hereby incorporated herein in its entirety.

BACKGROUND

1. Field

Various communication systems may benefit from the appropriate logging of measurements. For example, communication systems employing multimedia broadcast multicast service may benefit from logging multicast-broadcast single-frequency network measurements.

2. Description of the Related Art

Multimedia broadcast multicast service (MBMS) currently lacks fully agreed complete measurement definitions for the MBMS reception. Such definitions may need to take into account collection of multicast-broadcast single-frequency network (MBSFN) user equipment (UE) measurements with UE geographical location, to support verification of MBSFN actual signal reception and support planning and reconfiguration such as MBSFN areas and MBMS operation parameters selections. Furthermore, such definitions may need to specify MBSFN radio reception measurement(s) to be collected utilizing the third generation partnership project (3GPP) minimization of drive test (MDT) functionality.

Currently agreed L1 measurements include the following: MBSFN reference signal received power (RSRP) and reference signal received quality (RSRQ) per MBSFN area, where MBSFN received signal strength indicator (RSSI) averaging is over only orthogonal frequency division multiplexed (OFDM) symbols carrying MBSFN reference signal (RS); and multicast channel (MCH) block error rate (BLER) measurement per modulation and coding scheme (MCS) per MBSFN area. In this, measurements are to be done only in sub-frames and carriers where the UE is decoding physical multicast channel (PMCH).

Specifications for signaling aspects, such as how the measurements are configured, reporting details, enhancements to the network interfaces and functions, and the like, have concluded that only logged measurements are supported, both in idle and connected. Additionally, current logged MDT principles for configuration and reporting will be re-used to large degree, such that configuration is done on a dedicated control channel (DCCH) using existing logged measurement configuration and the UE will indicate about the available log which is sent to network on request using UEInformationRequest/-Response signaling According to these specifications, both management-based and signaling-based MDT may be used with the same principles as in legacy MDT.

The MBSFN transmission per MBSFN area conventionally consists of broadcasting, using SIB13, the allocation of MBMS control channel (MCCH), transmission of MCCH information such as MBSFN area configuration, including resource allocation for multicast traffic channel (MTCH), and transmission of MBMS traffic on MTCH. There is one MCCH per MBSFN area but there can be multiple services broadcast/multicast on a single MBSFN area.

The UE is conventionally supposed to regularly monitor the MCCH channel for any updated information. MCCH has a modification period and any content change is informed with a MBMS specific radio network temporary identifier (M-RNTI). The traffic is scheduled per MBMS scheduling period. The first MBMS sub-frame includes the MBMS scheduling information (MSI) which tell how the traffic for each active service is allocated within the MBMS scheduling period. Thus the scheduling can dynamically change from scheduling period to another. All this results in the MBSFN transmission having irregularity, which can impact how the UE can monitor and measure the PMCH.

The logged MDT measurement configuration conventionally defines the logging periodicity, namely how often the UE shall store measured results. The results are associated with a time and location information. The logging periodicity can be between 1 s and 61 s. With current logged MDT for radio resource management (RRM) related measurements, logged measurements are the latest available filtered measurement results for serving cell, neighbor cells or inter radio access technology (RAT) cells. The actual measurements are done just before the logging takes place.

With MBSFN reception, on the other hand, the situation is different due to the irregular and discontinuous nature of the measurement samples that the UE may get. Measurement time instants may be totally random with respect to the logging time instants. With long logging periodicities, the measurement time instants can be even tens of seconds before the logging is supposed to be done.

Further, the MDT log entry can be associated with the location information which should be related to the physical location where the measurement was done. This means that there is a limited validity time when the obtained location information is valid. If the measurement time instant deviates too much from the time a new location fix is obtained, accurate location information, from a stand-alone global navigation satellite system (GNSS) function such as global positioning system (GPS), is not stored. The available cell measurement results will provide information about coarse UE location.

For the RSRP/RSRQ measurement, the measurement period may be defined as follows: measurement contains at least 5 decoded MBSFN subframes with MCH (what the UE is receiving for the MBMS service of interest) or minimum measurement period is [640] ms.

The UE is conventionally only required to perform MBSFN measurements when the UE is otherwise required to decode the PMCH (MCCH and/or MTCH). The minimum requirements for the UE to monitor the PMCH is influenced by the network MBMS configuration (MCCH) and the network MBMS scheduling together with which MBMS services the UE is interested in and/or subscribed to.

UE monitoring only the MCCH (for example, when waiting for the MBMS service to start or being interested in receiving the MBMS service) the reception may happen infrequently as illustrated in FIG. 4. Specifically, FIG. 4 illustrates MCH reception when monitoring only MCCH.

If the minimum number of samples is five, the maximum duration of the measurement is 20.48 s: 4×5.12 s=4×mcch-ModificationPeriod/notificationRepetitionCoeff=20.48 s, where 5.12 s is the minimum that UE is to receive while monitoring only MCCH; mcch-ModificationPeriod=1024 radio frames, notificationRepetitionCoeff=2.

Thus, 4 intervals may be needed to receive 5 samples. Therefore, the measurement period may span multiple logging periods (logging period can be 1.28 s, 2.56 s, 5.12 s, . . . , 61.44 s). This means that if the five samples for a single measurement result represents a sliding window and the logging is done once per logging period, successive measurement results can be highly correlated or even the same, such as when no new samples are received during the last logging period, see FIG. 5. Specifically, FIG. 5 illustrates MCH reception versus logging periods.

The details of how the UE shall perform the measurements have not yet been specified. For example, it has not yet been specified whether the UE shall use 5 samples applying a sliding window approach or whether the UE shall measure using a 5 sample window.

SUMMARY

According to a first embodiment, a method can include logging, by a user equipment, a multicast-broadcast single-frequency network measurement corresponding to a logging period. The method can also include storing, at the time the multicast-broadcast single-frequency network measurement is made, cell measurement results.

In a variant, the cell measurement results can be used for coarse location estimation.

In a variant, the user equipment can log only a latest multicast-broadcast single-frequency network measurement prior to an end of the logging period.

In a variant, the multicast-broadcast single-frequency network measurement can include at least one of a reference signal received power measurement or a reference signal received quality measurement.

In a variant, the multicast-broadcast single-frequency network measurement can include a block error rate measurement.

In a variant, the method can further include associating the measurement with time information related to an actual measurement time instant.

In a variant, the method can additionally include collecting available accurate location information at a time of the measurement.

In a variant, the method can further include taking into account a validity time of the available accurate location information.

In a variant, the logging can include logging the length of the measurement period used when calculating a measurement result.

In a variant, the length of the measurement period can be presented as the number of logging periods, radio frames or radio sub-frames.

In a variant, the length of the measurement period can be presented as absolute time.

According to a second embodiment, an apparatus can include means for logging, by a user equipment, a multicast-broadcast single-frequency network measurement corresponding to a logging period. The apparatus can also include means for storing, at the time the multicast-broadcast single-frequency network measurement is made, cell measurement results.

In a variant, the cell measurement results can be used for coarse location estimation.

In a variant, the user equipment can log only a latest multicast-broadcast single-frequency network measurement prior to an end of the logging period.

In a variant, the multicast-broadcast single-frequency network measurement can include at least one of a reference signal received power measurement or a reference signal received quality measurement.

In a variant, the multicast-broadcast single-frequency network measurement can include a block error rate measurement.

In a variant, the apparatus can further include means for associating the measurement with time information related to an actual measurement time instant.

In a variant, the apparatus can additionally including means for collecting available accurate location information at a time of the measurement.

In a variant, the apparatus can further include means for taking into account a validity time of the available accurate location information.

In a variant, the logging can include logging the length of the measurement period used when calculating a measurement result.

In a variant, the length of the measurement period can be presented as the number of logging periods, radio frames or radio sub-frames.

In a variant, the length of the measurement period can be presented as absolute time.

According to a third embodiment, an apparatus can include at least one processor and at least one memory including computer program code. The at least one memory and the computer program code can be configured to, with the at least one processor, cause the apparatus at least to log, by a user equipment, a multicast-broadcast single-frequency network measurement corresponding to a logging period. The at least one memory and the computer program code can also be configured to, with the at least one processor, cause the apparatus at least to store, at the time the multicast-broadcast single-frequency network measurement is made, cell measurement results.

In a variant, the cell measurement results can be used for coarse location estimation.

In a variant, the user equipment can be configured to log only a latest multicast-broadcast single-frequency network measurement prior to an end of the logging period.

In a variant, the multicast-broadcast single-frequency network measurement can include at least one of a reference signal received power measurement or a reference signal received quality measurement.

In a variant, the multicast-broadcast single-frequency network measurement can include a block error rate measurement.

In a variant, the at least one memory and the computer program code can be configured to, with the at least one processor, cause the apparatus at least to associate the measurement with time information related to an actual measurement time instant.

In a variant, the at least one memory and the computer program code can be configured to, with the at least one processor, cause the apparatus at least to collect available accurate location information at a time of the measurement.

In a variant, the at least one memory and the computer program code can be configured to, with the at least one processor, cause the apparatus at least to take into account a validity time of the available accurate location information.

According to a fourth embodiment, a non-transitory computer-readable medium can be encoded with instructions that, when executed in hardware, perform a process. The process can be the method according to the first embodiment, in any of its variants.

According to a fifth embodiment, a computer program product can encode instructions for performing a process. The process can be the method according to the first embodiment, in any of its variants.

According to a sixth embodiment, a method can include using, by a user equipment, a predetermined number of samples to calculate a multicast-broadcast single-frequency network measurement result. The method can also include determining a time from a first sample of the predetermined number of samples to a last sample of the predetermined number of samples. The method can further include associating the determined time with the measurement result that is to be logged.

In a variant, the method can further include logging the measurement result with the associated time.

In a variant the time is represented in at least one way selected from time in seconds, time as the number of frames or subframes, or time as the number of logging periods.

In variant, the method can further include adding information to the log including information about whether all the samples are from the same logging period or whether the successive logged results are the same.

According to a seventh embodiment, an apparatus can include means for using a predetermined number of samples to calculate a multicast-broadcast single-frequency network measurement result. The apparatus can also include means for determining a time from a first sample of the predetermined number of samples to a last sample of the predetermined number of samples. The apparatus can further include means for associating the determined time with the measurement result that is to be logged.

In a variant, the apparatus can further include means for logging the measurement result with the associated time.

In a variant the time is represented in at least one way selected from time in seconds, time as the number of frames or subframes, or time as the number of logging periods.

In variant, the apparatus can further include means for adding information to the log including information about whether all the samples are from the same logging period or whether the successive logged results are the same.

According to an eighth embodiment, an apparatus can include at least one processor and at least one memory including computer program code. The at least one memory and the computer program code can be configured to, with the at least one processor, cause the apparatus at least to use a predetermined number of samples to calculate a multicast-broadcast single-frequency network measurement result. The at least one memory and the computer program code can be configured to, with the at least one processor, cause the apparatus at least to determine a time from a first sample of the predetermined number of samples to a last sample of the predetermined number of samples. The at least one memory and the computer program code can be configured to, with the at least one processor, cause the apparatus at least to associate the determined time with the measurement result that is to be logged.

In a variant, the at least one memory and the computer program code can be configured to, with the at least one processor, cause the apparatus at least to log the measurement result with the associated time.

In a variant the time is represented in at least one way selected from time in seconds, time as the number of frames or subframes, or time as the number of logging periods.

In variant, the at least one memory and the computer program code can be configured to, with the at least one processor, cause the apparatus at least to add information to the log including information about whether all the samples are from the same logging period or whether the successive logged results are the same.

According to a ninth embodiment, a non-transitory computer-readable medium can be encoded with instructions that, when executed in hardware, perform a process. The process can be the method according to the sixth embodiment, in any variants thereof.

According to a tenth embodiment, a computer program product can encode instructions for performing a process. The process can be the method according to the sixth embodiment, in any variants thereof.

BRIEF DESCRIPTION OF THE DRAWINGS

For proper understanding of the invention, reference should be made to the accompanying drawings, wherein.

DETAILED DESCRIPTION

All issues described above can make it challenging to determine when the UE should actually log the MSBFN results, what should be the time information and how to deal with the location validity. If current logging principles were used, the UE would log at the end of the logging period where there may not be any valid MBSFN measurement results: the measurements can be "outdated" in case of longer logging periodicities, and the location at the end of the logging period may not be relevant with the measurement sample. Therefore, the UE may not be able to log any valid MBSFN results and the log entry for a logging period could be empty or non-usable.

Accordingly, MBSFN measurement logging in certain embodiments includes the following features, either alone or in various combinations. The UE can store the latest MBSFN measurement result as it becomes available prior to the end of the logging period. The measurement result can be associated with time information related to the actual measurement time instant, not the time of the end of the logging period. Furthermore, the validity of available accurate location information can be checked at the time of the measurement and stored if valid. The time information associated with the measurement time instant can be stored at the same time. Additionally, coarse location information based on the cell measurement results can be stored at the time when the MBSFN measurements are done.

Although logging and storing may, in general, refer to similar recording techniques, for clarity the term "store" and "log" are used differently to help elucidate certain aspects of certain embodiments. For example, the UE may "store" multiple results during the logging period but only the last one is "logged" for later reporting.

Effective measurement storing may be basically random, depending on the allocation and scheduling of the MBMS control and traffic channels. There may, however, be only one log entry per logging period, the same way as with legacy logged MDT.

The logging principle can be applied for both RSRP/RSRQ and BLER measurements. In either case, the network (NW) can be aware of the approach used to determine the location in relation to the measurement samples.

Figure 1:
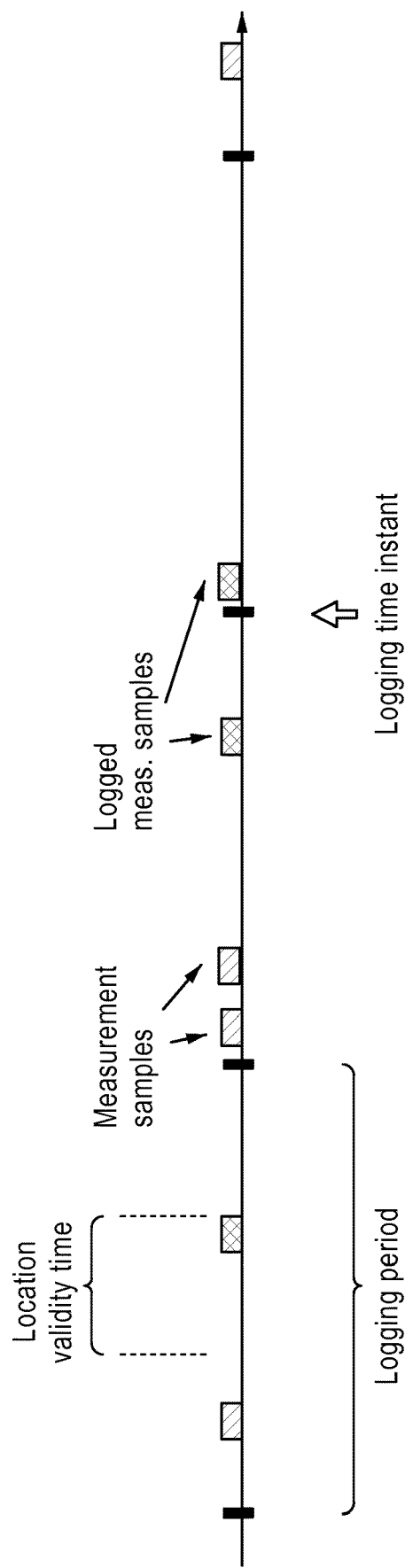
FIG. 1 illustrates MBSFN measurement logging according to certain embodiments.

FIG. 1 illustrates MBSFN measurement logging according to certain embodiments. More particularly, FIG. 1 illustrates the principle of how measurements can be logged according to one way of implementing a method according to certain embodiments. The vertical lines represent time where the configured logging periodicity is indicated. In current logged measurements, available measurement samples are logged at the defined logging time instants, namely at the end of each logging period.

The blocks in FIG. 1 represent the transmitted and received MBMS sub-frames, for example on PMCH, for the given MBSFN area and the service received by the UE. In this illustration, configured logging period and assumed sampling time instants are totally un-related to the samples that the UE may get from the MBSFN transmission.

In certain embodiments, the log entry per each logging period can be the last measurement result stored prior to the end of the logging period. The last stored result in each period is illustrated with different shading. There can be one last stored result per logging period, and that last stored result can be the only log entry stored during the logging period.

The measurement result can be associated with the time information at the time instant when the measurement result becomes ready. The accurate location information can be checked at the time when the measurement result becomes available and can be stored if considered valid with respect to the time of the measurement.

The measurements may have filtering or averaging using multiple samples. In that case, the time instant and the location validity can be related to the last sample of the measurements. This principle can be applied for both RSRP/RSRQ and BLER measurements. Also the time information to be stored can be related to the time of the last sample of the measurement.

In certain embodiments, the measurements and related time/location can be made basically independent. Thus, the logging can be done according to given (MDT) configuration (logging period), whereas the measurements can be independently made following the actual reception of the MBSFN signal(s). These two operations can be un-correlated. Thus, certain embodiments define what is to be logged, and when it is to be logged, when there is more or less random and independent reception of data during the logging period.

The preceding discussion described what measurement result(s) can be logged in each logging period and how the location and time information can be associated with the result. However, additional or new information can be added to the log entry. The new information can include the length of the measurement period used when calculating the measurement result. Although the approaches described in the preceding discussion can be used in combination with the approaches for providing additional or new information in the log entry, they can also be used separately. The length of the measurement period can be presented as the number of logging periods, radio frames or radio sub-frames. Alternatively, or in addition, the length of the measurement period can be presented as absolute time.

As mentioned above, conventionally the reported data, the log reporting to the network for MDT data analysis and post-processing, lacks information if the consecutive RSRP/RSRQ results are correlated, or even the same, or if they are totally independent measurement samples. This information would be useful in the MDT analysis (for example, network post-processing) to be able to identify possible issues with MBSFN quality and related possible problems to certain locations.

Moreover, the length of the measurement period can even be time-varying, from [640] ms and longer currently, which means that the network may not able to deduce the time information from the configuration parameters. Further, the MBSFN MDT log conventionally does not include any scheduling information related to the transmission of the MCH during the measurement period.

Assuming that there is a minimum number of samples, received PMCH, for the MBSFN measurement, the UE can be configured to use the latest five samples, or any specified/required number of samples, to calculate the MBSFN RSRP/RSRQ result. Next, the UE can count the time duration from the reception of the first sample until the last sample, in this case the fifth sample, used for the measurement result. The time information can be associated with the measurement result that is to be logged to MBSFN log with the measurement result. The time can be represented in a variety of ways, such as time in seconds, time as the number of frames or subframes, or the number of logging periods, namely how many logging periods the measurement period or five samples spans.

The information added to the log can optionally include information about whether all the samples are from the same logging period or not. The UE may also log whether the successive logged results are the same. For example, a successive logged result may be calculated from the same samples, for example when no MCH was received during the last logging period.

The UE may also log correlation of the successive measurement results. For example, the UE can log how many samples are common with the successive logged results. The correlation may be presented also with another calculated parameter or with actual correlation value.

If the logging period includes the minimum required number of samples or more samples, the UE may omit any time/correlation information in the log entry.

In addition to the above, the UE may indicate if the measurements are taken during MTCH reception or not. Also, or alternatively, the UE may indicate whether the measurements are taken during a period longer/shorter than a given threshold. This threshold can be configurable or specified. Moreover, the threshold can be the logging period or any other suitable value.

The UE may log an empty entry if the measurements are taken during a period exceeding a given threshold, which can be configured or specified, or if no new samples have been received during the latest logging period. In such a case, the measurement result would be the same as already logged. Alternatively the UE may only log results if the samples are taken within a minimum measurement window. The logging principle can be applied for both RSRP/RSRQ and BLER measurements.

Indeed, the method may be applicable not only to the LTE MBSFN RSRP/RSRQ measurements but also to MBSFN BLER or any other measurement where the measurement period is unknown or time varying or where the measurement results may become correlated. The method can also be used with other systems than LTE and other use cases than MBSFN.

The time information can also be sent in case the measurement principle is integrate and dump (I/D) or another approach than a sliding window measurement. With I/D, the correlation between samples may be zero. Hence, no correlation information may be needed. With I/D, logging may not happen in every logging period but only when the minimum required samples have been collected. The logging may then be irregular and may depend on the MCCH configuration and MTCH scheduling, if services are actively multicast/broadcast.

Network may include a time or measurement period threshold in the MDT configuration. Alternatively, such a threshold could be stated directly in a standards specification. If the UE has collected the measurements within the defined time threshold, the measurement sample can be seen as a valid log entry. Otherwise the sample can be regarded as an inaccurate log entry. The UE may or may not log the result where the time threshold has been exceeded. If logged, the UE may include an indication about the time exceeding the threshold. Alternatively, the logging could be omitted if the time is exceeding the threshold.

Figure 2:
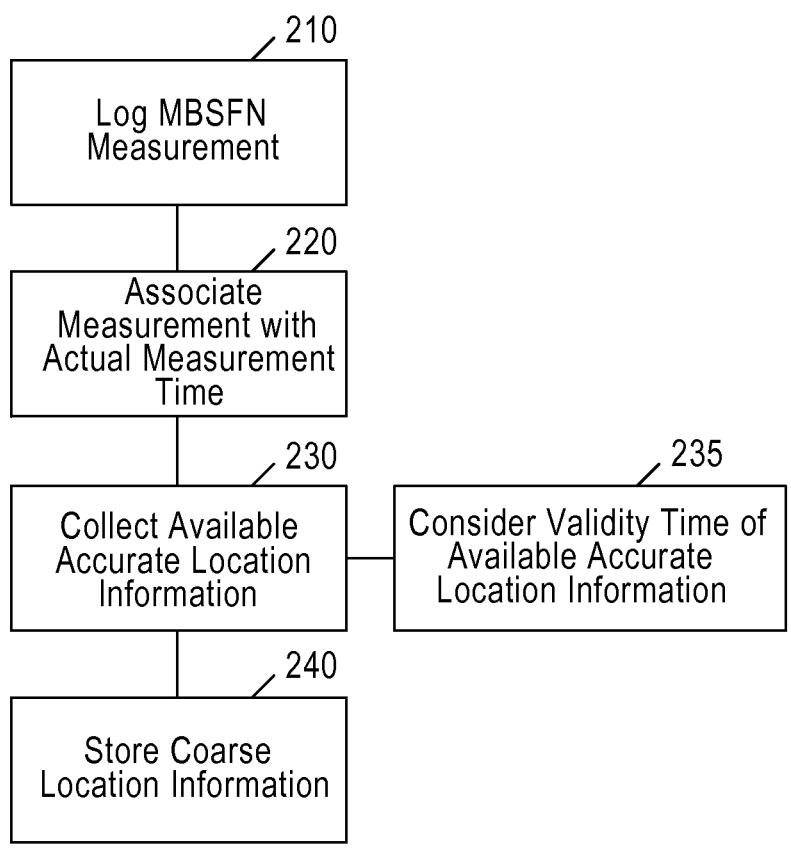
FIG. 2 illustrates a method according to certain embodiments.

FIG. 2 illustrates a method according to certain embodiments. As shown in FIG. 2, a method can include, at 210, logging, by a user equipment, a multicast-broadcast single-frequency network measurement corresponding to a logging period. The user equipment can log only a latest multicast-broadcast single-frequency network measurement prior to an end of the logging period.

The multicast-broadcast single-frequency network measurement can include at least one of a reference signal received power measurement or a reference signal received quality measurement. Alternatively, or in addition, the multicast-broadcast single-frequency network measurement can include a block error rate measurement.

The method can also include, at 220, associating the measurement with time information related to an actual measurement time instant. The method can further include, at 230, collecting available accurate location information at a time of the measurement. The method can additionally include, at 235, taking into account a validity time of the available accurate location information.

The method can also include, at 240, storing, at the time the multicast-broadcast single-frequency network measurement is made, one or more cell measurement results. The cell measurement results can be used for coarse location estimation.

Figure 3:
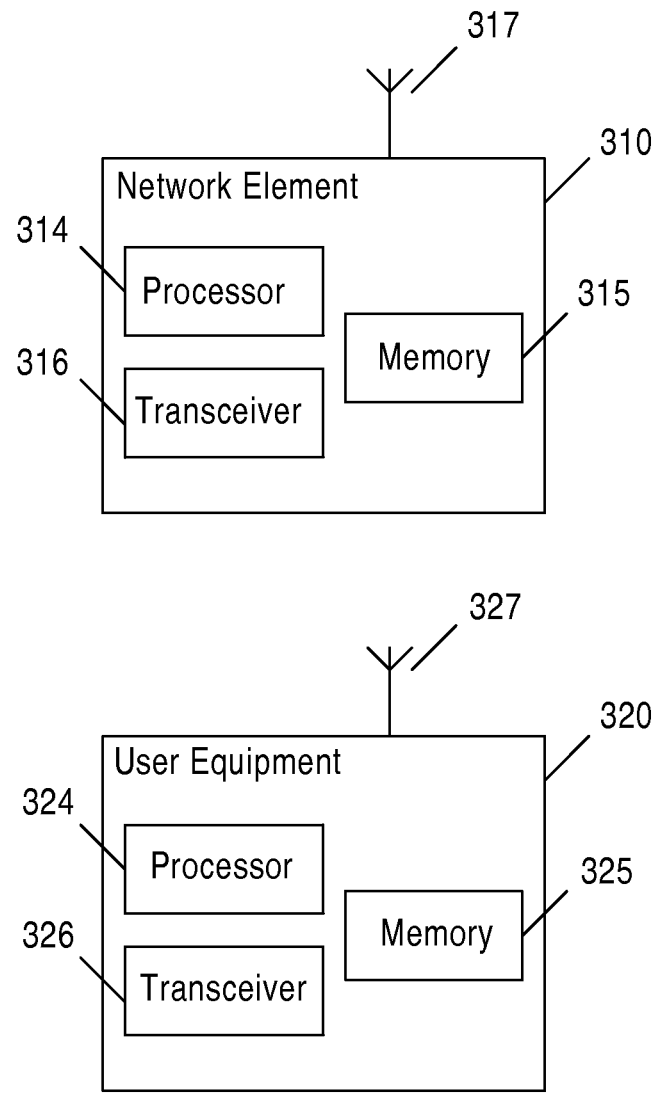
FIG. 3 illustrates a system according to certain embodiments.
Figure 4:
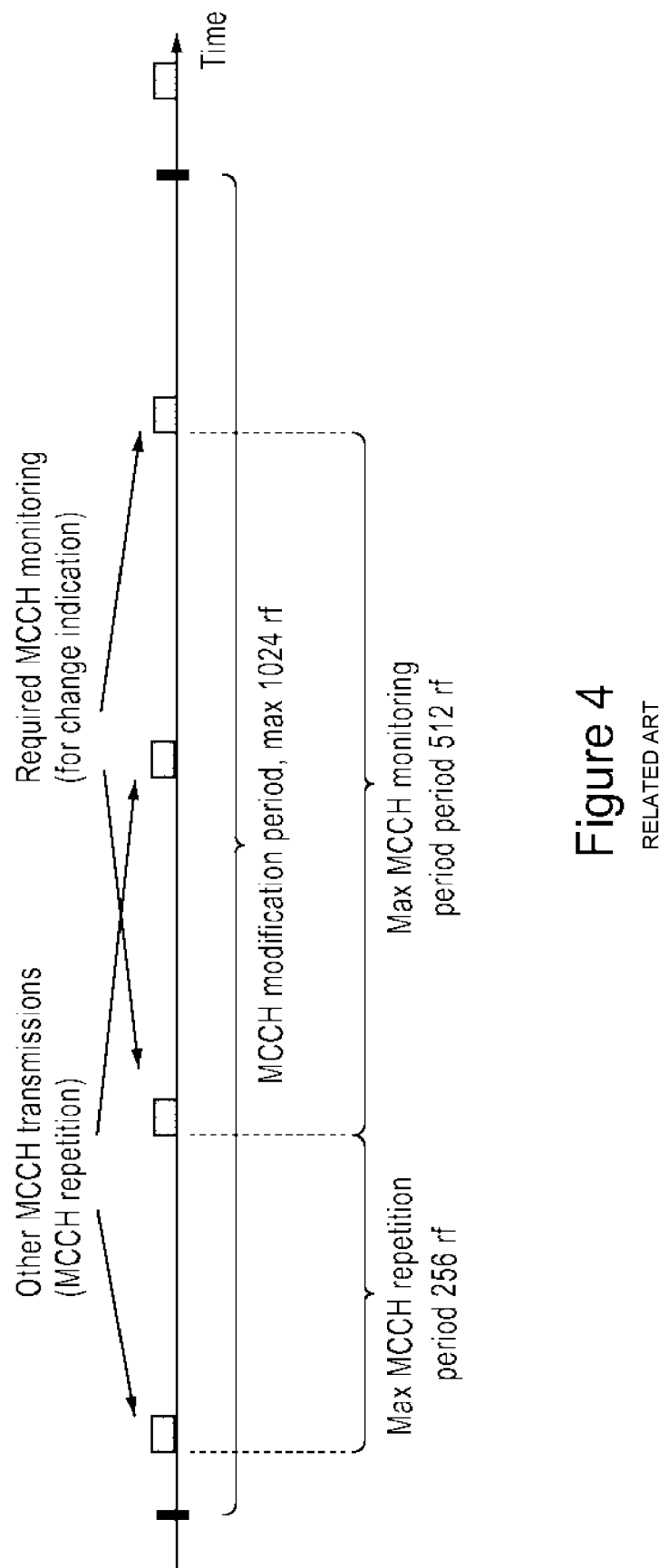
FIG. 4 illustrates MCH reception when monitoring only MCCH.
Figure 5:
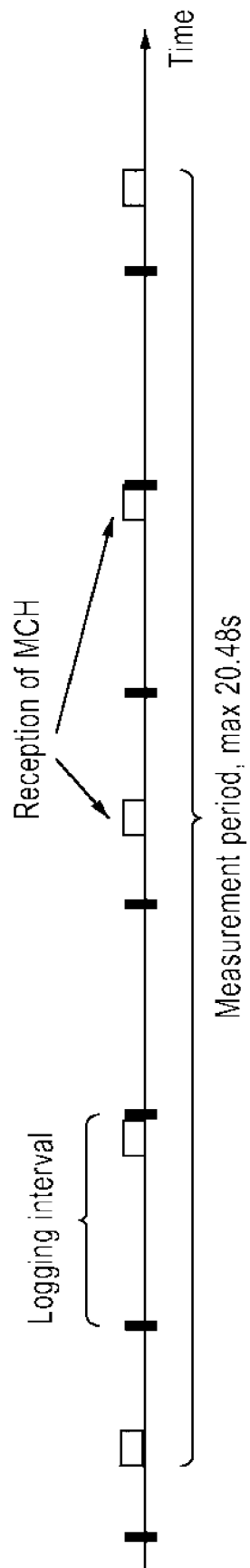
FIG. 5 illustrates MCH reception versus logging periods.

FIG. 3 illustrates a system according to certain embodiments of the invention. It should be understood that each block of the flowchart of FIG. 2 may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element. Each of these devices may include at least one processor or control unit or module, respectively indicated as 314 and 324. At least one memory may be provided in each device, and indicated as 315 and 325, respectively. The memory may include computer program instructions or computer code contained therein. One or more transceiver 316 and 326 may be provided, and each device may also include an antenna, respectively illustrated as 317 and 327. Although only one antenna each is shown, many antennas and multiple antenna elements may be provided to each of the devices. For example, a two-dimensional array of antenna elements may be used by network element 310. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIG. 2.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIG. 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Figure 6:
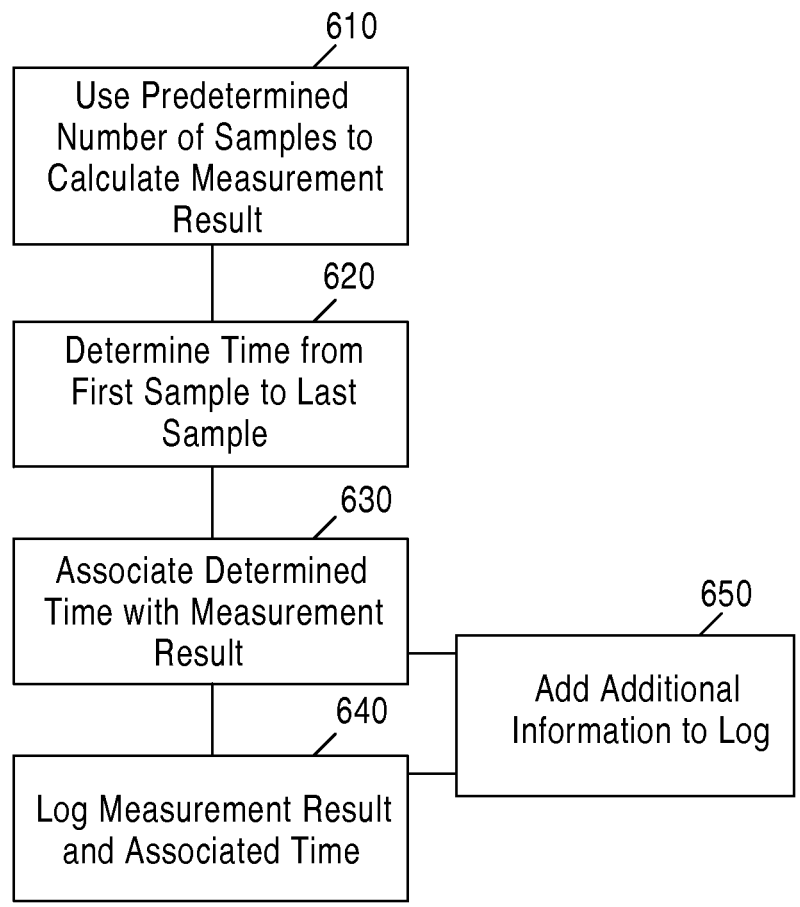
FIG. 6 illustrates another method according to certain embodiments.

FIG. 6 illustrates another method according to certain embodiments. As shown in FIG. 6, the method can include, at 610, using, by a user equipment, a predetermined number of samples to calculate a multicast-broadcast single-frequency network measurement result. The method can also include, at 620, determining a time from a first sample of the predetermined number of samples to a last sample of the predetermined number of samples. The method can further include, at 630, associating the determined time with the measurement result that is to be logged. The method also include, at 640, logging the measurement result with the associated time. The method can further include, at 650, adding information to the log including information about whether all the samples are from the same logging period or whether the successive logged results are the same.

Certain embodiments may have various benefits and/or advantages. For example, certain embodiments may provide an unambiguous definition as to when the UE shall log the MBSFN measurement results and how to add associated time and location information. Furthermore, certain embodiments can avoid the need to add new parameters for MBSFN logging configuration, as only the UE procedure may need to be defined. Additionally, in certain embodiments there may be no waste of any MBSFN results, which might otherwise be the case, if the logging were to be done at the end of the logging period, as now, and if there were no valid measurement results available.

Moreover, certain embodiments may provide sufficient information for the MBSFN MDT data analysis in order to be able to analyze correctly the reported data for any issues/remedies to be done for MBSM service quality. Furthermore, certain embodiments may utilize an additional function for the UE to provide full information related to a logged MBSFN measurement result. Additionally, certain embodiments may enable improved MBSFN optimization/verification. Moreover, certain embodiments may indirectly improve the provisioning of MBMS services.

Certain embodiments have been described with respect to MBSFN measurements. Nevertheless, the applicability of these embodiments is not limited to MBSFN, but the principles described can also be used with other measurements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

BLER Block Error Rate
CR Change Request
DCCH Dedicated Control Channel
eNB enhanced NodeB
GNSS Global Navigation Satellite System
GPS Global Positioning System
HSS Home Subscription Server or Home Subscriber Server
MBMS Multimedia Broadcast Multicast Service
MBSFN Multimedia Broadcast Single Frequency Network
MCCH MBMS Control Channel
MDT Minimization of Drive Tests
MTCH MBMS Traffic Channel
OFDM Orthogonal Frequency Division Multiplexing
PMCH Physical MBMS Channel
RRC Radio Resource Control
RS Reference Signal
RSRP Reference Signal Received Power
RSRQ Reference Signal Received Quality
SIB System Information Block
UE User Equipment

We claim:
1. A method comprising:
logging, by a user equipment, a multicast-broadcast single-frequency network measurement corresponding to a logging period configured for future reporting, wherein a length of the period is presented as a number of radio subframes, and wherein the logging comprises logging during the length of the period used when calculating a multicast-broadcast single-frequency network result;
associating the measurement with time information related to an actual measurement time instant;
collecting available accurate location information at a time of the measurement; and
storing, at the time the multicast-broadcast single-frequency network measurement is made, cell measurement results filtered from a predetermined minimum number of samples associated with calculating the multicast-broadcast single-frequency network result,
wherein the time the measurement is made is independent of the time the logging is performed,
wherein the user equipment logs only a latest multicast-broadcast single-frequency network measurement prior to an end of the logging period,
wherein the logged latest multicast-broadcast single-frequency network measurement is configured to support verification of multicast-broadcast single-frequency network actual signal reception, and
wherein the cell measurement results are used for coarse location estimation of coarse location information configured to be stored at the time when the multicast-broadcast single-frequency network measurement are done.
2. An apparatus, comprising:
at least one processor; and
at least one memory including computer program code, wherein the at least one memory and the computer program code are configured to, with the at least one processor, cause the apparatus at least to log, by a user equipment, a multicast-broadcast single-frequency network measurement corresponding to a logging period configured for future reporting, wherein a length of the period is presented as a number of radio subframes, and wherein the logging comprises logging during the length of the period used when calculating a multicast-broadcast single-frequency network result;

associate the measurement with time information related to an actual measurement time instant;

collect available accurate location information at a time of the measurement;

store, at the time the multicast-broadcast single-frequency network measurement is made, cell measurement results filtered from a predetermined minimum number of samples associated with calculating the multicast-broadcast single-frequency network result; and use the cell measurement results for coarse location estimation of coarse location information configured to be stored at the time when the multicast-broadcast single-frequency network measurement are done, wherein the time the measurement is made is independent of the time the logging is performed, wherein the user equipment logs only a latest multicast-broadcast single-frequency network measurement prior to an end of the logging period, wherein the logged latest multicast-broadcast single-frequency network measurement is configured to support verification of multicast-broadcast single-frequency network actual signal reception.

3. The apparatus of claim 2, wherein the user equipment is configured to log only a latest multicast-broadcast single-frequency network measurement prior to an end of the logging period.

4. The apparatus of claim 2, wherein the multicast-broadcast single-frequency network measurement comprises at least one of a reference signal received power measurement or a reference signal received quality measurement.

5. The apparatus of claim 2, wherein the multicast-broadcast single-frequency network measurement comprises a block error rate measurement.

6. The apparatus of claim 2, wherein the at least one memory and the computer program code are configured to, with the at least one processor, cause the apparatus at least to take into account a validity time of the available accurate location information.

7. The apparatus of claim 6, wherein the length of the logging period is presented as absolute time.

* * * * *